US010984564B2

United States Patent
Bergner et al.

(10) Patent No.: US 10,984,564 B2
(45) Date of Patent: Apr. 20, 2021

(54) IMAGE NOISE ESTIMATION USING ALTERNATING NEGATION

(71) Applicant: KONINKLIJKE PHILIPS N.V., Eindhoven (NL)

(72) Inventors: Frank Bergner, Uelzen (DE); Bernhard Johannes Brendel, Hamburg (DE); Thomas Koehler, Hamburg (DE); Kevin Martin Brown, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 48 days.

(21) Appl. No.: 16/463,859

(22) PCT Filed: Dec. 6, 2017

(86) PCT No.: PCT/EP2017/081593
§ 371 (c)(1),
(2) Date: May 24, 2019

(87) PCT Pub. No.: WO2018/104349
PCT Pub. Date: Jun. 14, 2018

(65) Prior Publication Data
US 2019/0385345 A1    Dec. 19, 2019

Related U.S. Application Data

(60) Provisional application No. 62/430,424, filed on Dec. 6, 2016.

(51) Int. Cl.
G06K 9/00         (2006.01)
G06T 11/00        (2006.01)
G01N 23/046       (2018.01)

(52) U.S. Cl.
CPC .......... *G06T 11/005* (2013.01); *G01N 23/046* (2013.01); *G01N 2223/401* (2013.01); *G01N 2223/419* (2013.01); *G06T 2210/41* (2013.01)

(58) Field of Classification Search
CPC ......... A61B 6/032; A61B 6/542; A61B 6/488; A61B 6/583; A61B 6/5205; A61B 5/055;
(Continued)

(56) References Cited

U.S. PATENT DOCUMENTS 7,706,497 B2    4/2010   Hsieh
2007/0140407 A1  6/2007  Chen
(Continued)

FOREIGN PATENT DOCUMENTS

WO     WO2016132880 A1    8/2016

OTHER PUBLICATIONS

Kim, Forward-Projection Architecture for Fast Iterative Image Reconstruction in X-Ray CT, Oct. 2012, IEEE (Year: 2012).*
(Continued)

*Primary Examiner* — Alex Kok S Liew
(74) *Attorney, Agent, or Firm* — Larry Liberchuk

(57) ABSTRACT

An imaging system (400) includes a radiation source (408) configured to emit X-ray radiation, a detector array (410) configured to detected X-ray radiation and generate projection data indicative thereof, and a first processing chain (418) configured to reconstruct the projection data and generate a noise only image. A method includes receiving projection data produced by an imaging system and processing the projection data with a first processing chain configured to reconstruct the projection data and generate a noise only image. A processor is configured to: scan an object or subject with an x-ray imaging system and generating projection data, process the projection data with a first processing chain configured to reconstruct the projection
(Continued)

data and generate a noise only image, process the projection data with a second processing chain configured to reconstruct the projection data and generate a structure image, and de-noise the structure image based on the noise only image.

20 Claims, 5 Drawing Sheets

(58) Field of Classification Search
CPC ......... A61B 6/03; A61B 6/5258; A61B 3/102; A61B 6/027; A61B 6/463; A61B 6/545; A61B 2503/40; A61B 2562/0204; A61B 3/0025; A61B 3/1233; A61B 5/0042; A61B 5/0095; A61B 6/481; A61B 6/5282; A61B 8/4245; A61B 8/4483; A61B 1/00009; A61B 1/00167; A61B 1/00172; G06T 11/008; G06T 11/005; G06T 2207/10081; G06T 7/0012; G06T 5/002; G06T 2211/436; G06T 2211/421; G06T 2207/10104; G06T 2207/30004; G06T 2211/412; G06T 5/001; G06T 2211/432; G06T 5/50

See application file for complete search history.

(56) References Cited

U.S. PATENT DOCUMENTS

| | | |
|---|---|---|
| 2008/0095462 A1 | 4/2008 | Hsieh |
| 2009/0232269 A1* | 9/2009 | Hsieh ..................... A61B 6/482 378/5 |
| 2011/0158498 A1 | 6/2011 | Li |
| 2012/0321157 A1 | 12/2012 | Yang |
| 2013/0089252 A1* | 4/2013 | Shechter ............... G06T 11/008 382/131 |
| 2014/0219529 A1 | 8/2014 | Shi |
| 2014/0270454 A1 | 9/2014 | Chen |
| 2016/0143606 A1 | 5/2016 | Yamakawa |

OTHER PUBLICATIONS

PCT International Search Report, International application No. PCT/EP2017/081593, dated Apr. 11, 2018.

* cited by examiner

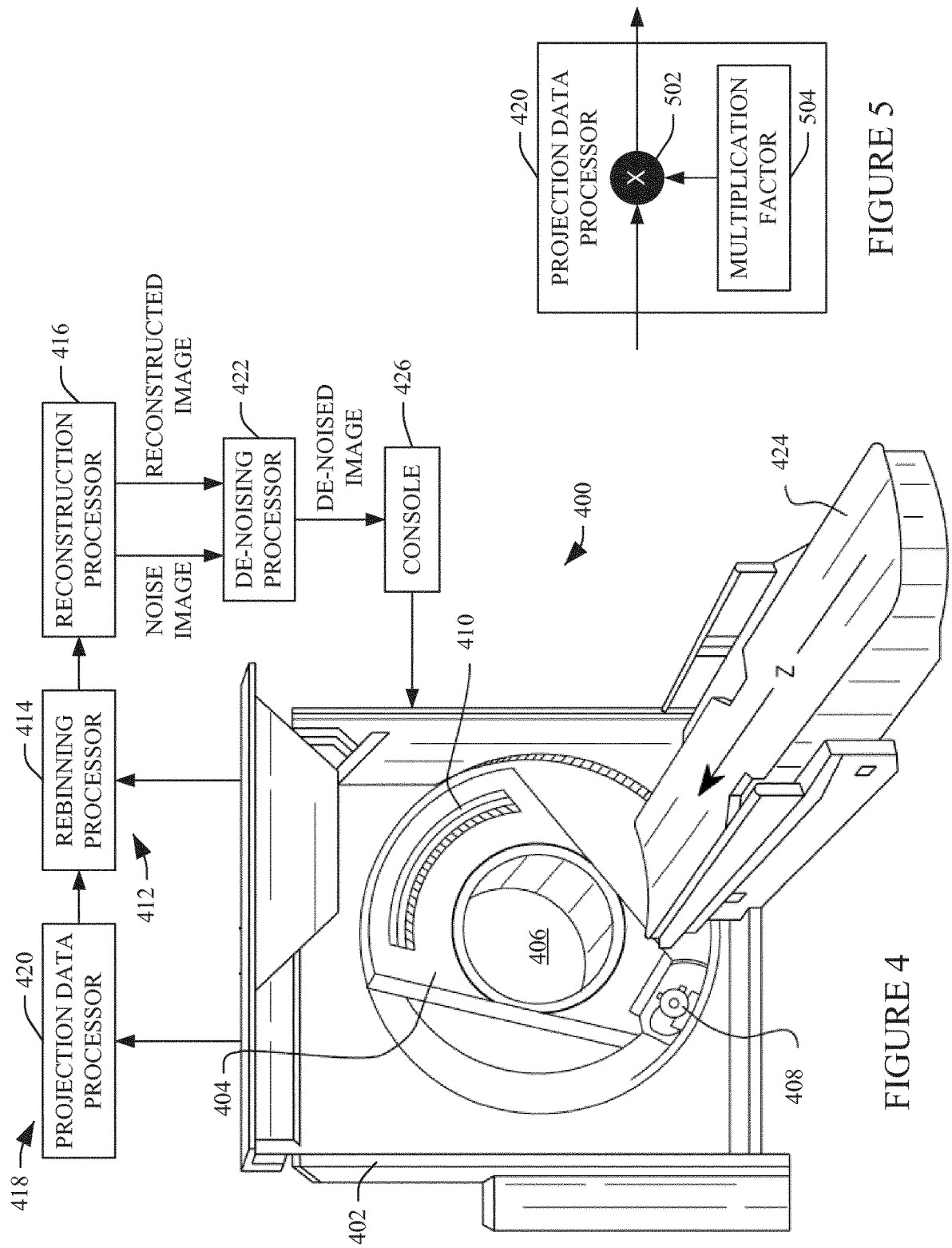

IMAGE NOISE ESTIMATION USING
ALTERNATING NEGATION

TECHNICAL FIELD

The following generally relates to estimating image noise for de-noising volumetric image data and more particularly to estimating image noise using an alternating negation approach, and is described with particular application to X-ray imaging such as computed tomography (CT) and/or other X-ray imaging.

BACKGROUND

A CT scanner includes an x-ray tube mounted on a rotatable gantry that rotates around an examination region about a z-axis. A detector array subtends an angular arc opposite the examination region from the x-ray tube. The x-ray tube emits radiation that traverses the examination region and a portion of an object and/or subject therein. The detector array detects radiation that traverses the examination region and generates projection data indicative thereof. A reconstructor reconstructs the projection data, which produces volumetric (three-dimensional) image data indicative of the examination region and the portion of the object and/or subject therein. The following describes projection data as utilized herein.

In FIG. 1, a focal spot 102 represents a region of the radiation source from which x-ray radiation 104 is emitted. A beam shaping device, such as a collimator 106, defines a beam 108 (e.g., a fan beam in the illustrated example) which traverses an examination region 110. A detector array 112 is disposed opposite the focal spot 102, across the examination region 110. The detector array 112 includes at least one row of detector elements $114_1, \ldots, 114_N$ (114). Each detector element 114 detects x-ray radiation from the fan beam impinging thereon and generates an electrical signal indicative of a total X-ray attenuation along a path from the focal spot 102 to the detector element 114 (a line integral).

With third generation CT scanner technology, the X-ray tube (and hence the focal spot 102) and the detector array 112 rotate in coordination along a circular path 116 around the examination region 110. FIG. 1 shows the focal spot 102, the fan beam 108, and the detector array 112 at one angle 113 (e.g., $\theta_1$) on the path 116, and FIG. 2 shows them at a different angle 115 (e.g., $\theta_N$) on the path 116. The set of lines integral for the detector elements 114 at any one angle is referred to herein as a view. The set of lines integrals at the angle 113 represents one view, and the set of lines integrals at the angle 115 represents another view. The set of views for a scan is referred to herein as projection data.

Denoising algorithms include algorithms that denoise in the projection domain (line integrals) and/or in the image domain (volumetric image data). For iterative image domain denoising, a noise image, which provides a map of the input image noise level in each pixel, is used to adjust the denoising strength for spatially varying noise levels. U.S. Pat. No. 7,706,497 B2 describes a method for determining a noise image for image domain denoising. This method includes splitting the projection data into odd views (e.g., $\theta_1$, $\theta_3$, $\theta_5$, ...) and even views (e.g., $\theta_2$, $\theta_4$, $\theta_6$, ...) (or different foci if the focus of the tube is switched back and forth from view to view). The set of odd views is reconstructed via one processing chain to produce an odd view image and the even set of view is reconstructed via a different processing chain to produce an even view image. The odd and even view images are subtracted to create the noise image. The idea is that the two sets of views are from a scan of a same structure. As such, both images essentially represent the same structure, and subtracting the two images will cancel out the structure, leaving only uncorrelated noise.

FIG. 3 illustrates this process via a flow diagram. Projection data generated from a scan is received at 302, and is split into odds views and even views at 304. An odd view processing chain 306 and 308 rebins the odd views from fan beam geometry to parallel beam geometry and reconstructs the rebinned odd views, producing an odd view image. An even view processing chain 310 and 312 rebins the even views from fan beam geometry to parallel beam geometry and reconstructs the rebinned even views, producing an even view image. At 314, the odd and even view images are subtracted, producing noise image. A processing chain 316 and 318 rebins all of views from fan beam geometry to parallel beam geometry and reconstructs the rebinned views, producing a structural image. At 320, local noise variance estimations are estimated from the noise image to produce a noise map for the structural image, and the structural image is de-noised using the noise map.

Unfortunately, this approach to generating a noise image reduces the angular or radial resolution since the views are split in half and has thus a negative impact on the resolution used in the rebinning and the reconstruction chains. In the rebinning process, the odd and even views are resampled via interpolation to different grids. The odd and even dataset after the rebinning will thus have worse resolution, and high frequency noise components cannot be reconstructed accurately. As a consequence, the final noise estimates might be inaccurate depending on the filter-kernel used for the reconstruction, which may result in a less than optimal de-noising and a de-noised image. As a result, there is an unresolved need for another approach for producing the noise image.

SUMMARY

Aspects described herein address the above-referenced problems and others.

In one aspect, an imaging system includes a radiation source configured to emit X-ray radiation, a detector array configured to detect X-ray radiation and generate projection data indicative thereof, wherein the projection data includes a plurality of views, and a first processing chain configured to reconstruct the projection data and generate a noise only image.

In another aspect, a method includes receiving projection data produced by an imaging system and processing the projection data with a first processing chain configured to reconstruct the projection data and generate a noise only image.

In another aspect, a computer readable storage medium is encoded with computer readable instructions. The computer readable instructions, when executed by a processer, causes the processor to: scan an object or subject with an x-ray imaging system and generate projection data, process the projection data with a first processing chain configured to reconstruct the projection data and generate a noise only image, process the projection data with a second processing chain configured to reconstruct the projection data and generate a structure image, and de-noise the structure image based on the noise only image.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 4 schematically illustrates an example imaging system with a processing chain, which includes a projection data processor, for generating an only noise image.

FIG. 5 schematically illustrates an example of the projection data processor.

DETAILED DESCRIPTION

Figure 1:
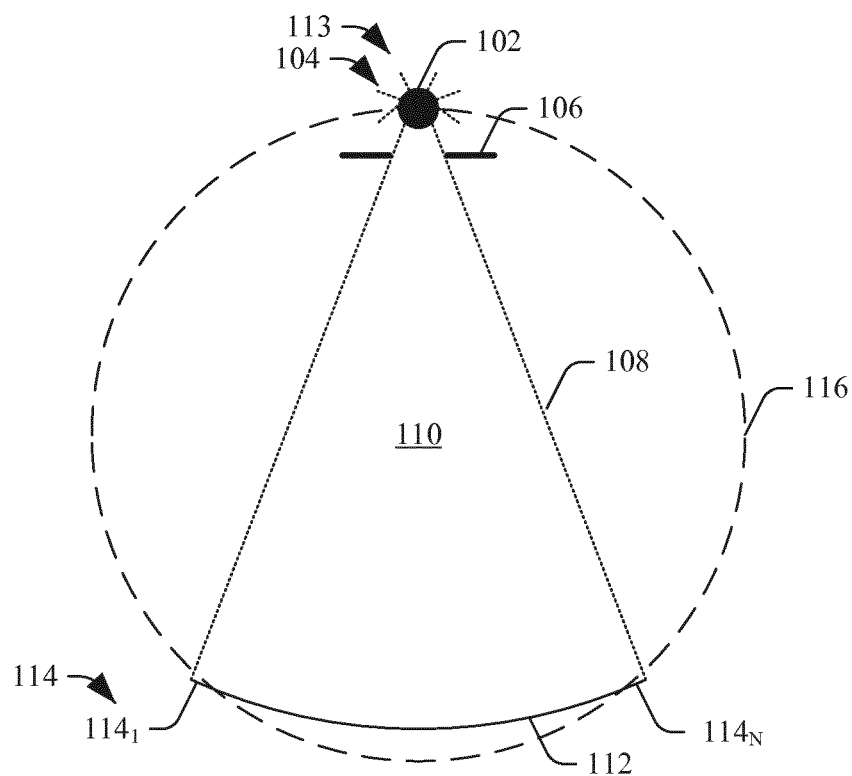
FIG. 1 describes one of a plurality of views of projection data.
Figure 2:
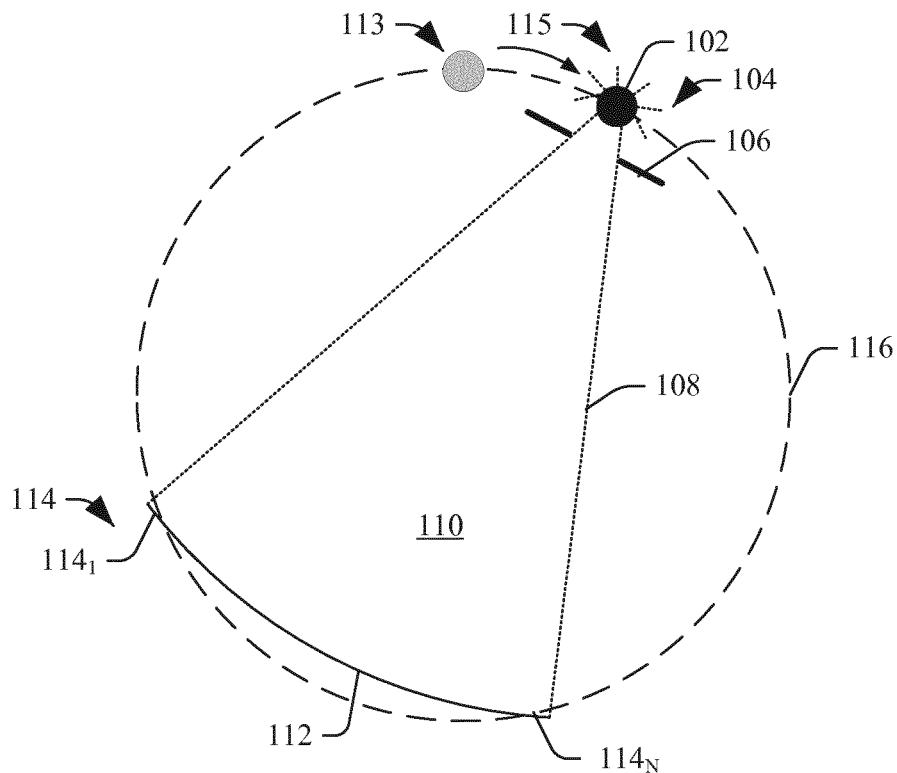
FIG. 2 describes a different view of the plurality of views.

FIG. 4 illustrates an imaging system 400 such as a computed tomography (CT) scanner. The imaging system 400 includes a generally stationary gantry 402 and a rotating gantry 404. The rotating gantry 404 is rotatably supported by the stationary gantry 402 via a bearing or the like and rotates around an examination region 406 about a longitudinal or z-axis.

A radiation source 408, such as an x-ray tube, is rotatably supported by the rotating gantry 404. The radiation source 408 rotates with the rotating gantry 404 and emits radiation that traverses the examination region 406. A source collimator includes collimation members that collimate the radiation to form a generally fan shaped radiation beam. In other embodiments, the beam is shape to form a generally cone, wedge or otherwise shaped radiation beam.

A one or two-dimensional radiation sensitive detector array 410 subtends an angular arc opposite the radiation source 408 across the examination region 406. The detector array 410 includes one or more rows of detectors that extend along the z-axis direction. The detector array 410 detects radiation traversing the examination region 406 and generates projection data indicative thereof.

As discussed herein, the projection data includes a plurality of views, each view corresponding to different angle of rotation at which data is acquired as the radiation source 408 and the detector array 410 around the examination region 406. Each view includes a plurality of values (line integrals) output by the detectors of the detector array 410, and each value is indicative of X-ray attenuation along a path from the radiation source 408 to a detector of the detector array 410 producing that value.

A first (conventional) processing chain 412 includes a rebinning processor 414 and a reconstruction processor 416. A second processing chain 418 includes a projection data processor 420, the rebinning processor 414 and the reconstruction processor 416. In this example, the processing chains 412 and 418 share a rebinning processor and a reconstruction processor. In a variation, each of the processing chains 412 and 418 has its own rebinning processor and/or a reconstruction processor.

For the first processing chain 412, the rebinning processor 414 rebins the views from fan beam geometry to parallel beam geometry. The reconstruction processor 416 reconstructs the rebinned views and generates volumetric image data (referred to as a "structural image"). For the second processing chain 418, the projection data processor 420 pre-processes the views before rebinning by the rebinning processor 414 and reconstruction by the reconstruction processor 416 so that structure represented in the projection data cancels out during the rebinning and reconstruction acts, producing an only noise image.

An example of the projection data processor 420 is shown in FIG. 5. A multiplier 502 multiplies the views of the projection data by a predetermined multiplication factor 504. In one instance, this includes multiplying a first view by a value of positive one, a second view by a value of negative one, a third view by a value of positive one, a fourth view by a value of negative one, . . . an (n−1)th view by a value of positive one, an nth view by a value of negative one, or vice versa in which the first view is multiplied by a value of negative one, a second view is multiplied by a value of negative one, . . . . This approach is referred to herein as an alternating negation approach.

Generally, the predetermined multiplication factor 504 alternates between positive one and negative from view to view. In a variation, the multiplication factor 504 does not have to alternate view to view. For example, in another instance, the multiplication factor 504 can instead alternate every set of two or more views. For instance, this may include multiplying a first view by a value of positive one, a second view by a value of positive one, a third view by a value of negative one, a fourth view by a value of negative one, . . . . In another variation, the predetermined multiplication factor 504 can include values other than positive and negative one.

Returning to FIG. 4, the output of the first processing chain 412 is conventional volumetric image data with pixels/voxels representing the scan structure along with noise, and the output of the second processing chain 418 is an only noise image. In this example, with both processing chains 412 and 418 the rebinning processor 414 implements a conventional or other fan-to-parallel beam rebinning algorithm, and the reconstruction processor 416 implements a conventional or other filtered back-projection (FBP) reconstruction algorithm and/or other reconstruction such as an iterative reconstruction algorithm and/or other reconstruction algorithm.

A non-limiting example of fan-to-parallel beam rebinning is described in U.S. Pat. No. 6,078,639 A, filed Nov. 26, 1997, and entitled "Real time continuous CT imaging," and a non-limiting example of filtered back projection reconstruction is described in US 2006/0140335 A1, filter Feb. 9, 2004, and entitled "System and method for helical cone-beam computed tomography with exact reconstruction," both of which are incorporated herein by reference in their entireties. Other approaches are also contemplated herein.

A de-noising processor 422 receives both the reconstructed image (3-D image data) and the noise image, and de-noises the reconstructed image using the noise image. For example, the de-noising processor 422 produces a noise map or estimates of a noise variance and/or a noise standard deviation from the noise image. In one instance, this is achieved by taking a local varaiance or standard deviation of a small region of interst (ROI) and move that through the image. An example image domain de-noising algorithm which utilizes a noise standard deviation is described in U.S. Pat. No. 9,1591,22 B2, filed Nov. 12, 2012, and entitled "Image domain de-noising," US 2016/0140725 A1, filed Jun. 26, 2014, and entitled, "Methods of utilizing image noise information," and U.S. Pat. No. 8,938,110 B2, filed Oct. 29, 2015, and entitled "Enhanced image data/dose reduction," which are incorporated by reference in their entireties herein.

A subject support 424, such as a couch, supports an object or subject such as a human patient in the examination region 406. The subject support 424 is configured to move the object or subject for loading, scanning, and/or unloading the object or subject. A general-purpose computing system or computer serves as an operator console 426. The console 426 includes a human readable output device such as a monitor and an input device such as a keyboard, mouse, etc. Software resident on the console 426 allows the operator to interact with and/or operate the imaging system 400 via a graphical user interface (GUI) or otherwise. This includes selecting an imaging protocol such as one utilizing the de-noising processor 422 to de-noise the reconstructed image.

Although the above shows the projection data coming directly from the imaging system 400, in a variation the projection data can be received and/or retrieved from a data repository such as a picture archiving and communication system (PACS), a radiology information system (RIS), a hospital information system (HIS), and/or other data repository. Additionally or alternatively, the reconstructed image, the noise image and/or the de-noised reconstructed image can be stored in the data repository.

Additionally or alternatively, at least one of the projection data processor 420, the rebinning processor 414, the reconstruction processor 416, and the de-noising processor 422 is part of the console 426 and/or a computing device remote from and external to the imaging system 100. For example, one or more of these components can be part of a "cloud" based service, distributed over a plurality of devices, part of another imaging system, etc.

Figure 6:
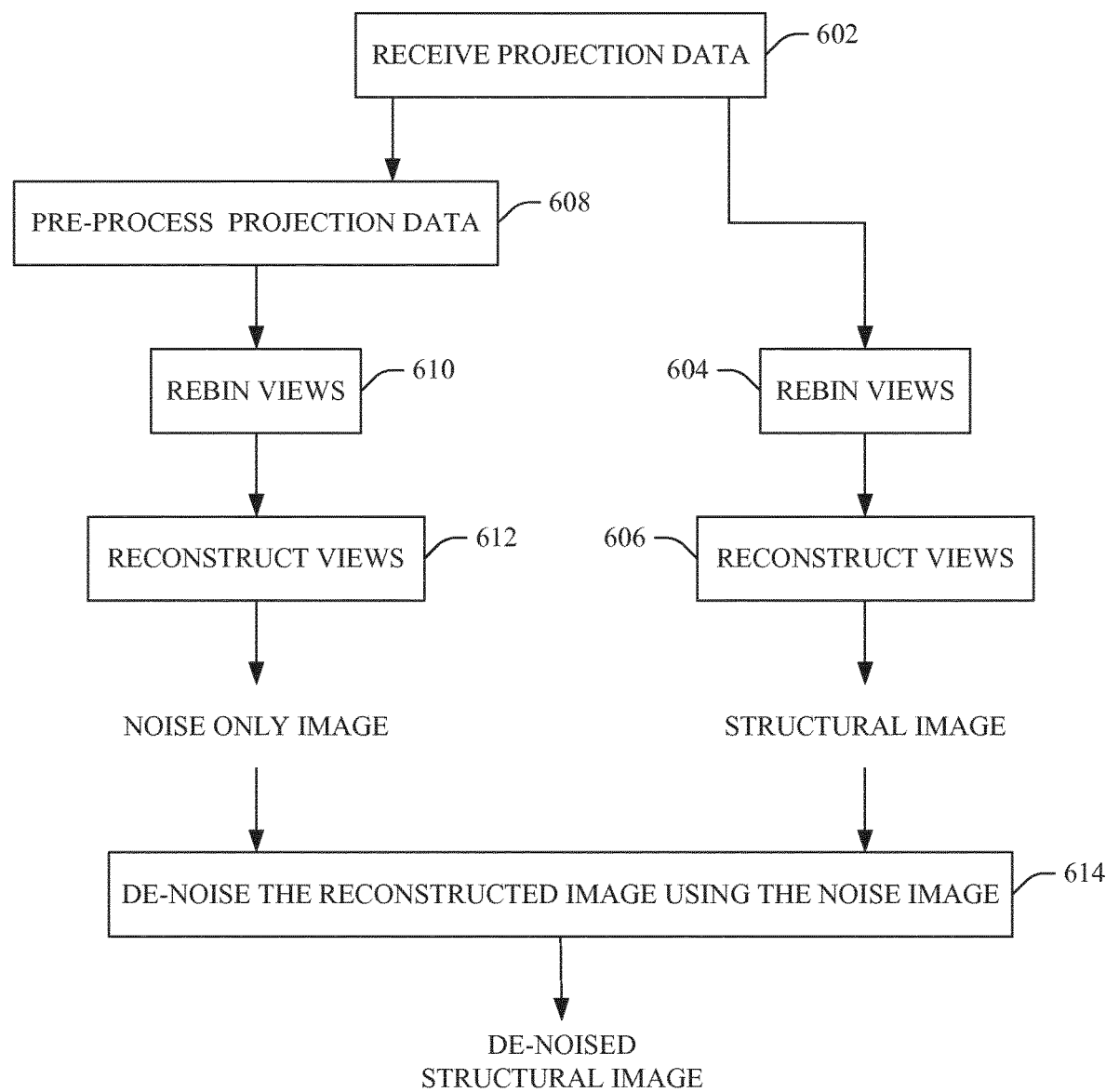
FIG. 6 illustrates an example method in accordance with an embodiment herein.

FIG. 6 illustrates an example method in accordance with an embodiment herein.

It is to be appreciated that the ordering of the acts in the methods is not limiting. As such, other orderings are contemplated herein. In addition, one or more acts may be omitted and/or one or more additional acts may be included.

At 602, projection data from a scan of a subject or object is obtained. The projection data can be generated by the imaging system 400 and/or other imaging system during a scan and obtained therefrom and/or from a data repository.

At 604 and 606, the projection data is processed through a conventional processing chain which includes rebinning the projection data from fan beam to parallel beam format and reconstructing the parallel beam data via filtered back projection, producing a structural image (volumetric image data) of the scanned subject or object.

At 608, the projection data is also pre-processed by alternating multiplying views by positive one and negative one, or vice versa, as described herein, producing pre-processed projection data.

At 610 and 612, the pre-processed projection data is processed through a conventional processing chain which includes rebinning the pre-processed projection data from fan beam to parallel beam format and reconstructing the parallel beam data via filtered back projection, producing a noise only image.

At 614, the structural image is de-noised using the noise image, as described herein, producing a de-noised structural image.

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

Figure 3:
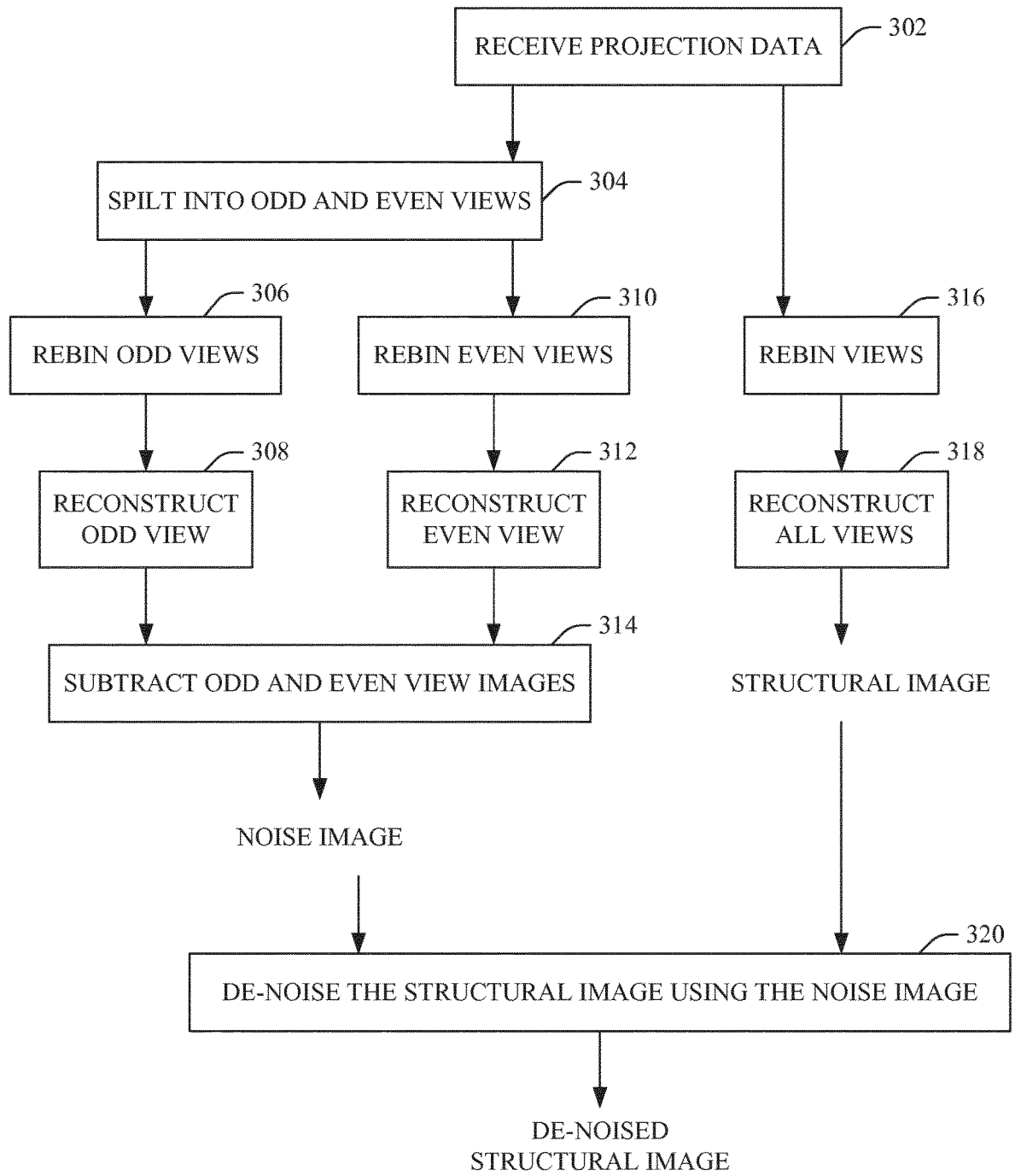
FIG. 3 is a flow diagram of a prior art method for producing a noise image for image domain denoising by splitting the views into odd and even views.
Figure 7:
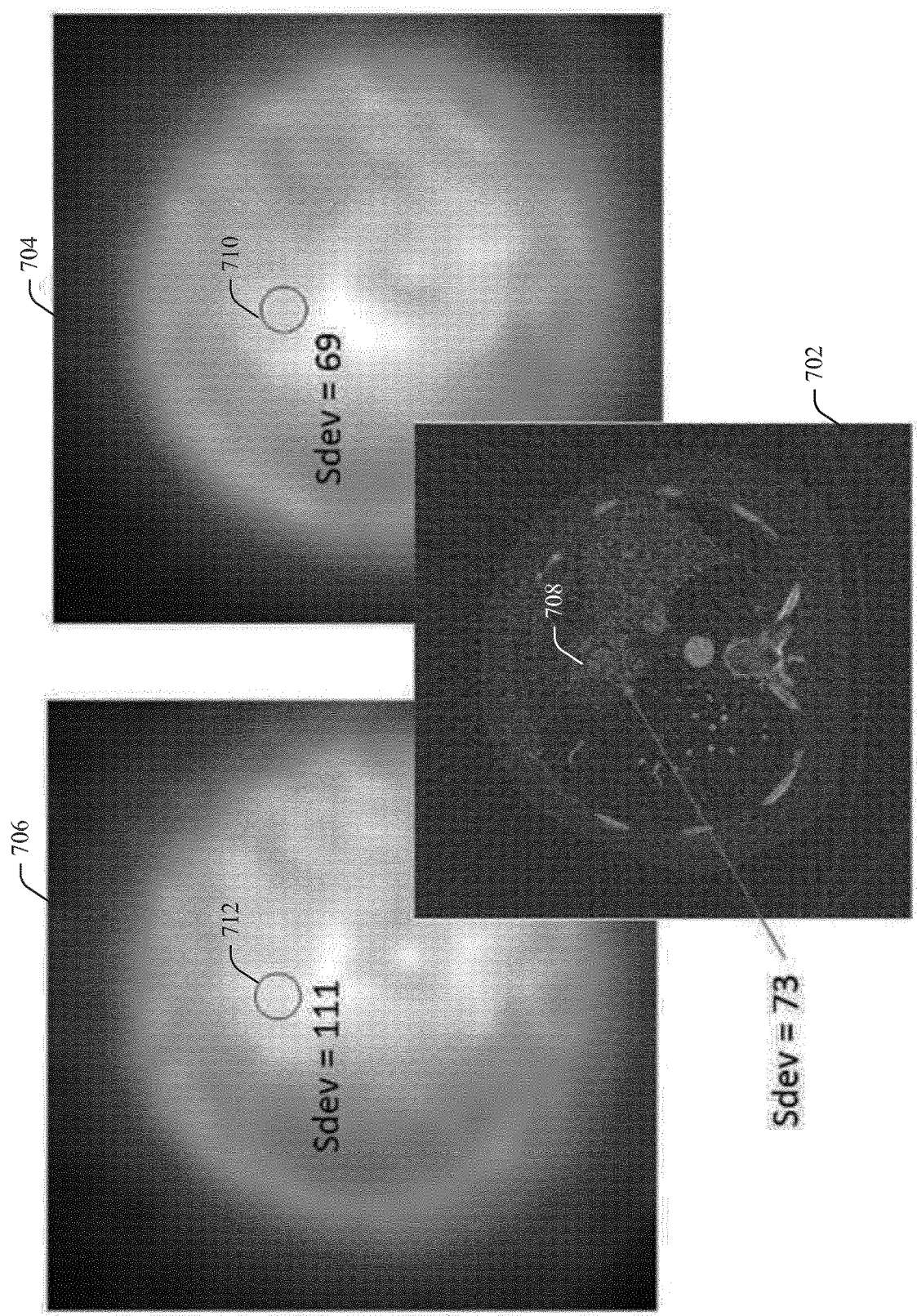
FIG. 7 shows a comparison of a noise image generated with the approach described herein and a noise image generated with a prior art approach.

As a comparison, FIG. 7 shows a structural image 702, a noise image 704 using the approach described herein, and a noise image 706 using the prior art approach described in FIG. 3. The noise images 704 and 706 show a noise value for each pixel/voxel of the structural image 702. A noise standard deviation is computed for the pixel/voxels values of a region of interest (ROI) 708 of the structural image 702. Generally, the ROI 708 is placed over an area of a same anatomical tissue that appears to have a same or similar CT number ("flat"). In this example, the noise standard deviation for the ROI 708 is 73.

In the noise image 704, a ROI 710 is placed at the same location as the ROI 708 in the structural image 702. In the noise image 706 of the prior art, a ROI 712 is also placed at the same location as the ROI 708 in the structural image 702. As shown, using the approach described herein produces a noise standard deviation (69) which is close to the noise standard deviation for the ROI 708 of the structural image 702, and closer to the noise standard deviation for the ROI 708 of the structural image 702 relative to the noise standard deviation (111) for the ROI 712 of the prior art noise image 706.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An imaging system, comprising:
   a radiation source configured to emit X-ray radiation;
   a detector array configured to detect the X-ray radiation and generate projection data indicative thereof, wherein the projection data includes a plurality of views; and
   a first processing chain configured to:
      multiply at least two views of the plurality of views of the projection data by at least two negative values, respectively, to produce pre-processed projection data; and
      after the multiplying by the at least two negative values, reconstruct the pre-process projection data and generate a noise only image.

2. The imaging system of claim 1, wherein the first processing chain includes a projection data processor configured to multiply the plurality of views by a predetermined multiplication factor and produce the pre-processed projection data.

3. The imaging system of claim 2, wherein each of the at least two negative values is negative one, and
   the predetermined multiplication factor multiplies every other view of the plurality of views of the projection data by negative one.

4. The imaging system of claim 3, wherein the predetermined multiplication factor multiplies remaining views of the plurality of views of the projection data by positive one.

5. The imaging system of claim 2, wherein the first processing chain further includes a rebinning processor configured to rebin the pre-processed projection data to parallel beam format.

6. The imaging system of claim 5, wherein the first processing chain further includes a reconstruction processor configured to reconstruct the rebinned pre-processed projection data to generate the noise only image.

7. The imaging system of claim 1, further comprising:
a second processing chain configured to reconstruct the projection data and generate volumetric image data including structure and noise.

8. The imaging system of claim 7, further comprising:
a de-noising processor configured to de-noise the volumetric image data using the noise only image, thereby generating de-noised volumetric image data.

9. The imaging system of claim 8, wherein the de-noising processor estimates at least one of a noise variance and a noise standard deviation from the noise only image, which is used to de-noise the volumetric image data.

10. A method for processing data, comprising:
receiving projection data produced by an imaging system, wherein the projection data includes a plurality of views; and
processing the projection data with a first processing chain configured to:
multiply at least two views of the plurality of views of the projection data by at least two negative values, respectively, to produce pre-processed projection data; and
after the multiplying by the at least two negative values, reconstruct the pre-process projection data and generate a noise only image.

11. The method of claim 10, wherein processing the projection data includes:
multiplying the plurality of views of the projection data by a predetermined multiplication factor to produce the pre-processed projection data, prior to the reconstructing of the pre-processed projection data.

12. The method of claim 11, wherein the multiplying includes:
multiplying even number views by one of negative one or positive one and multiplying odd number views by the other of negative one or positive one.

13. The method of claim 11, further comprising:
rebinning the pre-processed projection data to parallel beam format; and
reconstructing the rebinned data to generate the noise only image.

14. The method of claim 10, further comprising:
processing the projection data with a second processing chain configured to reconstruct the projection data and generate an image of structure.

15. The method of claim 14, wherein the processing includes:
rebinning the projection data to parallel beam format; and
reconstructing the rebinned data to generate the image of structure.

16. The method of claim 13, further comprising:
estimating at least one of noise variance and noise standard deviation based on the noise only image by taking a local noise variance or noise standard deviation of a region of interest and moving the region of interest through the image.

17. The method of claim 15, further comprising:
de-noising the image of structure based on the noise only image, thereby producing a de-noised image of the structure.

18. A non-transitory computer readable storage medium encoded with one or more computer executable instructions, which, when executed by a processor, causes the processor to:
scan an object or subject with an x-ray imaging system and generate projection data, wherein the projection data includes a plurality of views;
process the projection data with a first processing chain configured to:
multiply at least two views of the plurality of views of the projection data by at least two negative values, respectively, to produce pre-processed projection data; and
after the multiplying by the at least two negative values, reconstruct the pre-process projection data and generate a noise only image;
process the projection data with a second processing chain configured to reconstruct the projection data and generate a structure image; and
de-noise the structure image based on the noise only image.

19. The non-transitory computer readable storage medium of claim 18, wherein the processor further:
multiplies the plurality of views of the projection data by a predetermined multiplication factor to produce the pre-processed projection data;
rebins the pre-processed projection data to parallel beam format; and
reconstructs the rebinned data to generate the noise only image.

20. The non-transitory computer readable storage medium of claim 18, wherein the processor further:
employs alternating negation to the projection data to produce pre-processed projection data.

* * * * *